Nov. 1, 1966  C. C. QUARLES  3,282,644
PROCESS FOR THE MANUFACTURE OF HYDROGEN FLUORIDE
Filed Feb. 15, 1965  2 Sheets-Sheet 1
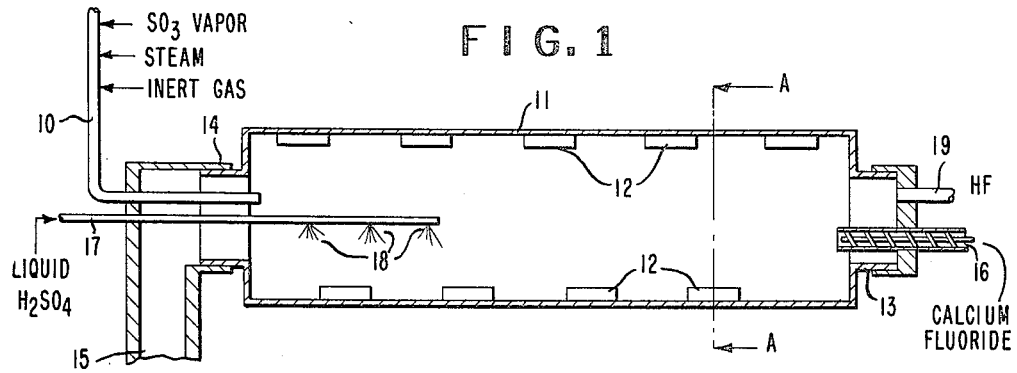
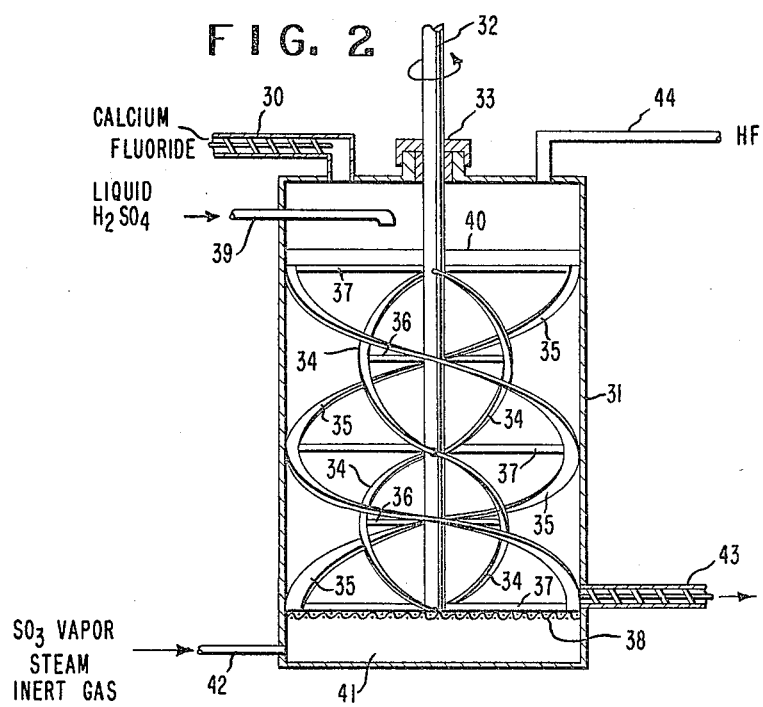
INVENTOR
CHARLES C. QUARLES
BY Norbert F. Reinert
ATTORNEY

INVENTOR
CHARLES C. QUARLES

BY *Norbert F. Reinert*

ATTORNEY

United States Patent Office 3,282,644
Patented Nov. 1, 1966

3,282,644
PROCESS FOR THE MANUFACTURE OF
HYDROGEN FLUORIDE
Charles C. Quarles, Baytown, Tex., assignor to E. I. du Pont de Nemours and Company, Wilmington, Del., a corporation of Delaware
Filed Feb. 15, 1965, Ser. No. 432,523
2 Claims. (Cl. 23—153)

This application is a continuation-in-part of my copending application Serial No. 426,601, filed January 19, 1965.

This invention relates to the production of hydrogen fluoride in which a metal fluoride is reacted with sulfuric acid. More particularly, this invention relates to a method for achieving a surprising improvement in the product capacity of a hydrogen fluoride reactor in which an alkali metal or alkaline earth metal fluoride is reacted with sulfuric acid by charging the metal fluoride reactant to the reactor as small particles of controlled size in combination with supplying energy input into the solid bed in excess of a critical amount during its contact by sulfuric acid.

According to the present invention, it has been found that such surprising improvement in HF product capacity can be obtained if the particle size of metal fluoride feed to the reactor is controlled so that it is not less than 75% through 100 mesh but preferably not less than 90% through 100 mesh and the energy input to the metal fluoride solids bed throughout its reaction with sulfuric acid is in excess of 4000 foot-pounds per pound of feed (ft.-lbs./lb. of feed). Although the value of 4000 ft.-lbs./lb. of feed represents an approximate threshold value for obtaining the improvements in process efficiency according to the present invention, it is most preferable to operate the process of the invention at an energy input level in excess of 7000 ft.-lbs./lb. of feed in order to maximize the advantages to be gained from the principles of the invention. The term "not less than 75% through 100 mesh" used herein means that 75% by weight of the particles pass through a 100 mesh USS standard sieve. The values of energy in ft.-lbs./lb. of feed given herein refer to the net energy input to bed material in the reactor and is, of course, equal to the work performed on the bed. The amount of the net energy in actual practice for all types of reactors represents the total energy input less that consumed by friction of drives, etc. Unless the reactor design is such that the static weight of the reactor bed increases friction losses greatly the net energy can be computed from power input under operating conditions less the power input without a solids bed in the machine.

In the case of flighted rotary reactors as discussed herein the net energy input is conveniently calculated using the following formula $$W = ALNRhd/F \text{ ft.-lbs./lb. of feed}$$

$W$ = unit work, or energy, input to bed per unit of feed expressed in ft.-lbs./lb. of feed.
$A$ = flight or lifter load at point where showering starts, cu. ft./ft. of length.
$L$ = length of reactor containing flights, feet.
$N$ = number of flights in cross section of reactor.
$R$ = reactor speed, revolutions/minute.
$h$ = average height solids are lifted before showering, feet.
$d$ = density of bed solids as carried on flights, pounds/cubic foot.
$F$ = reactor fluoride feed rate, pounds/minute.

The average lift height, $h$, in all calculations herein was obtained by summing the products of incremental changes in flight load as showering progressed, times the height, $h_i$, at time of showering and then dividing the sum of these products by, A, to get the average lift, $h$. The lift at time of showering, $h_i$, was taken as the average height above the bottom of the reactor shell of the incremental load when showered.

For fluidized bed reactors, the energy input to the solids bed will be a combination of that supplied by the mechanical agitator system and the inlet gas stream. The energy input from mechanical agitation, of course, will vary depending upon design detail and can be calculated using well-known engineering principles or determined experimentally in a manner such as discussed hereinabove by measuring power requirements under load and no load conditions.

It will be appreciated by those skilled in the art that the level of energy input required in accordance with the invention is considerably higher than that conventionally employed in the industry. The improvement obtained in product capacity as a result of this energy input is highly unexpected based upon improvements obtained by increasing energy inputs within previously known limits. It is to be further appreciated that the improvements of the invention are only available when the particle size of the fluoride solids is controlled as herein specified. If appreciably larger particles are used, some of the energy input is expended simply in reducing the particle size of the metal fluoride reactant rather than improving the efficiency and completeness of reaction between the metal fluoride and sulfuric acid.

The present invention is particularly preferred as an improvement in the process for producing hydrogen fluoride disclosed in U.S. Patent 3,102,787 assigned to my assignee, in which the metal fluoride bed is contacted with and reacts with a gas containing sulfur trioxide vapor, water vapor and sulfuric acid vapor and wherein the heat liberated from the gas stream as the sulfuric acid condenses on solid particles supplies the endothermic heat required to react the condensed liquid sulfuric acid with the metal fluoride. It is disclosed in this patent that there should be enough sulfuric acid condensed upon the particles to effect a rapid reaction, but there should not at any time be enough condensed acid to cause the particles to become sticky and hence to form an objectionable paste or sticky mass characteristic of other hydrogen fluoride processes. It has been found that the features of controlled fluoride particle size and energy input of the present invention can be readily incorporated into this process to produce the desired improvements in product capacity within the range of operating conditions where such pastes or sticky masses do not develop. In addition, by incorporating the features of the present invention this HF process can be operated closer to the limits wherein a caking tendency would otherwise begin to limit its operability or efficiency. This is particularly advantageous in the fluidized bed type reactor where acidity above a critical limit has a tendency to cause loss of fluidization. Mechanical agitation in such a reactor maintains efficient solid-gas contacting even though a loss of a true fluidized state in the reactor should occur.

For the above reason, the present invention will be described hereinafter in connection with the HF process of the type described in U.S. Patent 3,102,787. It is also to be understood that the present process applies to preparation of hydrogen fluoride from any alkali metal or alkaline earth metal fluoride. However, because of its low cost, the mineral fluorospar which is essentially calcium fluoride, is preferred and thus the invention will be described in connection with this fluoride as the reactant material.

The following detailed description is taken together with the accompanying patent drawings in which:

FIGURE 1 illustrates schematically a continuous rotary reactor found useful for the process of this invention.

FIGURE 2 illustrates schematically a single stage fluidized bed reactor suitable for purposes of carrying out the present invention.

Figure 3:
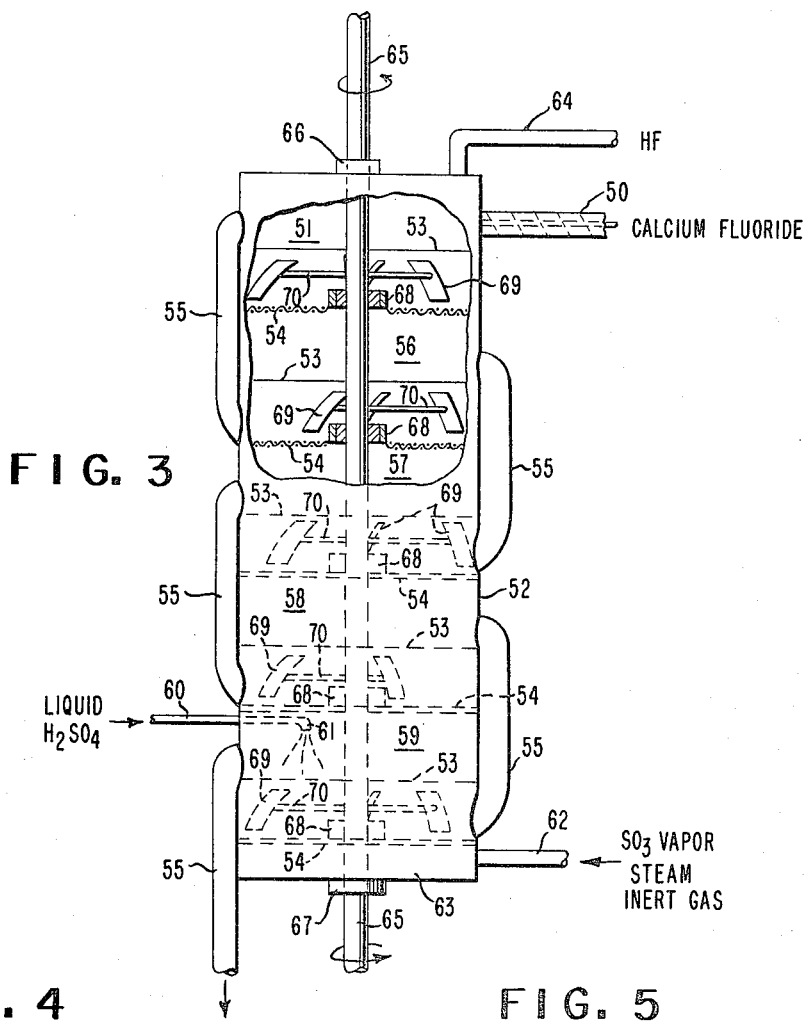
FIGURE 3 illustrates schematically an alternative embodiment of a fluidized bed reactor suitable for carrying out the process of the present invention.

Referring to FIGURE 1, $SO_3$ vapor, steam and an inert gas are mixed in line 10 and the resulting mixture enters a rotary reactor consisting of a rotary shell 11 equipped with lifter blades 12 to pickup bed material and shower solids through the vapor space of the reactor. The reactor is equipped with suitable seals 13 and 14 to prevent leakage of air into or process gasses out of the reactor.

The reacted residue leaves by overflowing through stationary nozzle 15. Calcium fluoride having a particle size not less than 75% through 100 mesh is fed continuously in through screw 16. Liquid sulfuric acid is fed through line 17 and vaporized from sprays 18. The heat and material balances within the reactor are controlled according to the principles disclosed in U.S. Patent 3,102,787 and my application S.N. 426,601 filed January 19, 1965, and assigned to my assignee. The product gas containing the HF exists via line 19 and goes to dust collection and product collection and purification facilities which are of conventional design and do not constitute a part of this invention.

Energy input in accordance with the present invention is thus supplied to the solids bed both by the tumbling of solids caused by rotation of shell 11 and/or the showering of solids caused by the action of lifter blades 22 on the solids within the reactor.

Figure 4:
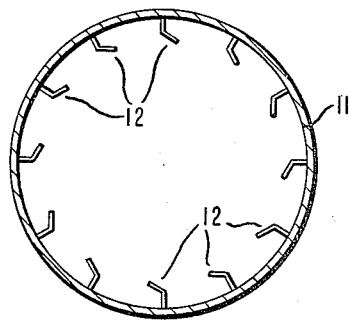
FIGURES 4 and 5 are alternative cross-sectional views taken on the line A—A through the reactor of FIGURE 1 illustrating flights or lifter blade designs suitable for supplying energy input to a solids bed of an HF reactor in accordance with the invention.
Figure 5:
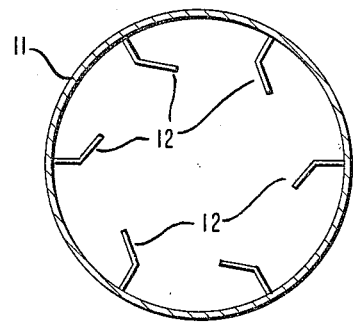

FIGURES 4 and 5 represent alternate cross-sectional views of rotating shell 11 for purposes of illustrating two suitable arrangements of lifter blades 12 for purposes of the invention. FIGURE 4 shows the relatively close spacing of such blades, each of which has a relatively small lifting space. FIGURE 5 shows the use of only half as many blades as shown in FIGURE 4 but each of which has a relatively large lifting space.

Referring now to FIGURE 2, calcium fluoride having a particle size not less than 75% through 100 mesh is fed through screw 30 to stationary reactor 31. Revolving agitator shaft 32 enters the reactor through a suitable rotating gas-tight seal 33 to prevent the leakage of air into or process gases out of the process. Inside the reactor agitator blades 34 and 35 are mounted from shaft 32 by means of spokes 36 and 37. Agitator blades 34 and 35 are shown in the form of ribbon type blades or flights which are particularly preferred for the process of the invention when carried out in this type reactor. The ribbon mounting spokes 36 at the bottom of reactor 31 are preferably inclined plate-type blades which will clean the face of and lift material off the perforated gas inlet grid 38. In some cases it is desirable to pitch the ribbons or blades to impart conveying action in opposing directions.

Liquid surfuric acid is fed into the reactor through pipe 39 and sprayed above or into the top of the reaction bed 40. At the bottom of the reactor $SO_3$ vapor, steam and inert gas, if used, are fed jointly into the gas inlet plenum chamber 41 through inlet line 42. The reactor is controlled according to the principles disclosed in U.S. Patent 3,102,787. The gases then rise into the reaction bed through grid 38. Just above support grid 38 the calcium fluoride residue is withdrawn through screw 43. The HF product gas leaves reactor 31 via line 44.

The movement of reactor agitator blades 34 and 35 through the solids bed is so controlled as to supply together with the energy input from the feed gases the total energy input level required for the purposes of the invention.

Referring now to FIGURE 3, metal fluoride is fed through feed screw 50 into the top zone 51 of a multistage fluidized bed reactor 52. The metal fluoride is preheated and partially reacted in the uppermost bed 53 which is supported by screen 54. Bed material from zone 51 overflows through downcomer 55 into zone 56 where it further reacts in the bed supported on another screen 54. The bed material continues to work its way from zone 56 to 57 to 58 to 59 by way of the downcomers 55 and reacts as it descends. Into zone 59 liquid sulfuric acid is fed through pipe 60 and sprayed into or above the solids bed through nozzle 61. The residue consisting largely of calcium sulfate overflows through downcomer 55 and is removed from the process.

Through line 62 a mixture of $SO_3$ vapor, steam and inert gas, if used, are injected into the gas inlet plenum chamber 63 where it then passes through the support screen 54 into the bed in zone 59 where liquid sulfuric acid is vaporized. The gas mixture from zone 59 successively rises up the column through the bed support screens 54 reacting as it rises. The residual gas plus the HF generated then exit the top of the reactor through line 64 to the purification system of conventional desgin. The reaction is controlled in accordance with the principles disclosed in U.S. Patent 3,102,787 and my copending application S.N. 426,601.

Revolving agitator shaft 65 enters the top of the reactor through a gas-tight seal 66 which prevents gas leakage into or out of the reactor. The shaft continues downward through the entire length of the reactor and projects through the bottom at gas-tight seal 67 which prevents the leakage of gases into or out of the reactor. The necessary bearings and drives for the agitator have not been shown since they would be familiar to anyone skilled in the art. At the position where agitator shaft 65 passes through each bed support screen 54 a rotating seal 68 is provided to restrict gas leakage past the shaft. Unlike seals 66 and 67, seal 68 can tolerate much higher leakage since the gas passes into the reacting bed but the leakage must not be high enough to cause gross short-circuiting.

In each bed layer 53, agitator shaft 65 is equipped with agitating blades 69 by means of spokes 70. Blades 69 are preferably pitched to impart an upward lift to the solids and the number of blades in each zone are selected so that all parts of the screen 54 is circled by the bottom end of a blade. The rotation of shaft 65 is controlled so that the movement of blades 69 through the layers of solids bed provides together with the energy input from the feed gases the total required for the purposes of the invention.

The invention will be further explained by the following examples illustrating the preferred modes contemplated for carrying out the invention.

*Example 1*

Using an apparatus of the type shown in FIGURE 1 and having a diameter of 19 inches, a length of 15 feet with 12 lifter flights of general type shown in FIGURE 4 each having a maximum height of 2 inches above the shell, and operating at 4 r.p.m. commercial acid grade fluorspar, 60% through 325 mesh is introduced through feed screw 12 at a rate of 75 pounds per hour. Sulfur trioxide vapor at 5 p.s.i.g. and 100° C. is fed into line 10 at a rate of 47 pounds per hour together with saturated steam at a pressure of 5 p.s.i.g. in the amount of 10.6 pounds per hour and also HF vapor, as an inert gas, at 5 p.s.i.g. and 150° C. at the rate of 10 pounds per hour. Through the spray nozzles 18 sulfuric acid of 99% strength is added at the rate of 41 pounds per hour. The acid is equally distributed to each of 3 spray nozzles. Temperatures of the bed in the reactor increases from about 170° C. near the fluorspar addition end to about 320° C. at the residue discharge end.

Calcium sulfate containing about 1% unreacted calcium fluoride and approximately 3% free sulfuric acid is discharged through nozzle 15. Hydrogen fluoride containing silicon tetrafluoride, carbon dioxide, sulfur dioxide, sulfuric acid vapor and mist, and dust exits via line 19. The gas stream is purified by conventional methods and pure HF recovered.

During a period of stable operation under the above conditions the retention time of the solids in the reactor is measured by injecting a tracer element into the feed fluorspar and monitoring the discharge residue for tracer content. The average residence time is found to be 4.5 hours and the energy input is calculated to be about 4000 ft.-lbs./lb. of feed. Any appreciable lowering of energy input to the solids bed is found to require a disproportionate increase in the amount of residence time required to maintain the capacity of the reactor the same.

*Example 2*

Using the same apparatus as used in Example 1 except that the lifters are replaced with 6 lifters as shown in FIGURE 5 each of a maximum height of 3 inches above the shell and still operating at 4 r.p.m.; the reactor is operated at the same values of all feeds given in Example 1 and with the same results. Once again the retention time of the solids is found to be the same as in Example 1.

*Example 3*

Again using the identical apparatus with the same lifters used in Example 1 but rotating at 9 r.p.m. commercial grade fluorspar, 60% through 325 mesh is introduced through feed screw 16 at a rate of 75 pounds per hour. Sulfur trioxide vapor at 5 p.s.i.g. and 100° C. is fed into line 10 at rate of 47 pounds per hour together with saturated steam at a pressure of 5 p.s.i.g. in the amount of 10.6 pounds per hour and also HF vapor, as an inert gas, at 5 p.s.i.g. and 150° C. at the rate of 10 pounds per hour. Through the spray nozzles 18 sulfuric acid of 99% strength is added at the rate of 38 pounds per hour. The acid is equally distributed to each spray nozzle. Temperatures of the bed in the reactor increases from about 170° C. near the fluorspar feed end to about 320° C. at the residue discharge end.

Calcium sulfate containing 0.2% unreacted calcium fluoride and approximately 1% free sulfuric acid is discharged through nozzle 15.

As in Example 1 impure HF leaves by nozzle 19 and is conventionally recovered.

During a period of stable operation under the above conditions the energy input is calculated to be about 8000 ft.-lbs./lb. of feed and the retention time is measured and found to be approximately 4.0 hours.

*Example 4*

Using an apparatus of the type shown in FIGURE 1 but of appreciably larger size having a diameter of 9 feet, a length of 125 ft. with 18 lifter flights of general types shown in FIGURES 4 and 5 each of a maximum height of 14 inches above the shell and operating at 2.5 r.p.m., commercial acid grade fluorspar, 60% through 325 mesh is introduced through feed screw 12 at the rate of 16,000 pounds per hour. Sulfur trioxide vapor at 5 p.s.i.g. and 100° C. is fed into line 10 at a rate of 10,100 pounds per hour together with saturated steam at a pressure of 5 p.s.i.g. in the amount of 2,300 pounds per hour and also HF vapor, as an inert gas, at 5 p.s.i.g. and 150° C. at the rate of 2,100 pounds per hour. Through the spray nozzles 18 sulfuric acid of 99% strength is added at the rate of 8,300 pounds per hour. The acid is equally distributed to each of 5 spray nozzles. Temperatures of the bed in the reactor increases from about 170° C. near the fluorspar addition end to about 320° C. at the residue discharge end.

Calcium sulfate containing about 0.2% unreacted calcium fluoride and approximately 1% free sulfuric acid is discharged through nozzle 15. Impure hydrogen fluoride leaves via line 19 and is recovered conventionally.

During the period of stable operation under the above conditions the retention time of the solids in the reactor is measured as in the previous examples and found to be only about 2.6 hours. The energy input is calculated to be 10,000 ft.-lbs./lb. of feed.

Since many different embodiments of the invention may be made without departing from the spirit and scope thereof, it is to be understood that the invention is not limited by the specific illustrations hereinabove set forth except to the extent defined in the following claims.

I claim:
1. In a process for producing hydrogen fluoride from calcium fluoride wherein solid particles of said fluoride having a partial size "not less than 75% through 100 mesh" are contacted with a gas-containing sulfur trioxide vapor, water vapor, and sulfuric acid vapor in a closed reactor at conditions whereby sulfuric acid condenses on said solid particles and the heat liberated thereby supplies the endothermic heat required to react the condensed acid with the fluoride of said solid particles, the improvement comprising supplying an amount of energy input to said solid particles throughout its reaction with sulfuric acid in excess of 4000 ft. lbs./lb. of feed.

2. In a process for producing hydrogen fluoride from calcium fluoride wherein solid particles of said fluoride having a particle size "not less than 75% through 100 mesh" are contacted with a gas-containing sulfur trioxide vapor, water vapor, and sulfuric acid vapor in a closed reactor at conditions whereby sulfuric acid condenses on said solid particles and the heat liberated thereby supplies the endothermic heat required to react the condensed acid with the fluoride of said solid particles, the improvement comprising supplying an amount of energy input to said solid particles throughout its reaction with sulfuric acid in excess of 7000 ft.-lbs./lb. of feed.

References Cited by the Examiner
UNITED STATES PATENTS
3,102,787   9/1963   McMillan et al. _____ 23—153

References Cited by the Applicant
UNITED STATES PATENTS
1,665,588   4/1928   Harshaw et al.
1,748,735   2/1930   Scott.
3,063,815   11/1962   Redniss.

OSCAR R. VERTIZ, *Primary Examiner.*

E. STERN, *Assistant Examiner.*

UNITED STATES PATENT OFFICE
CERTIFICATE OF CORRECTION

Patent No. 3,282,644　　　　　　　　　　　　　　　November 1, 1966

Charles C. Quarles

It is hereby certified that error appears in the above numbered patent requiring correction and that the said Letters Patent should read as corrected below.

Column 6, line 29, for "partial" read -- particle --.

Signed and sealed this 5th day of September 1967.

(SEAL)
Attest:

ERNEST W. SWIDER　　　　　　　　　　　　　　EDWARD J. BRENNER
Attesting Officer　　　　　　　　　　　　　　　　Commissioner of Patents